US011923612B2

(12) United States Patent
Akbar et al.

(10) Patent No.: US 11,923,612 B2
(45) Date of Patent: Mar. 5, 2024

(54) SYSTEMS AND METHODS FOR CIRCULAR-POLARIZED BEAM FORMING AND STEERING BASED ON THE SUPERPOSITION OF CIRCULAR MODES FOR COMMUNICATION AND RADAR SYSTEMS

(71) Applicants: Fatemeh Akbar, Tehran (IR); Behzad Yektakhah, Ann Arbor, MI (US)

(72) Inventors: Fatemeh Akbar, Tehran (IR); Behzad Yektakhah, Ann Arbor, MI (US)

(73) Assignee: Sharif University of Technology, Tehran (IR)

( * ) Notice: Subject to any disclaimer, the term of this patent is extended or adjusted under 35 U.S.C. 154(b) by 34 days.

(21) Appl. No.: 17/830,502

(22) Filed: Jun. 2, 2022

(65) Prior Publication Data

US 2023/0395996 A1 Dec. 7, 2023

(51) Int. Cl.

*H01Q 21/29* (2006.01)
*H01Q 5/371* (2015.01)
*H01Q 9/26* (2006.01)
*H01Q 9/40* (2006.01)
*H01Q 21/20* (2006.01)

(52) U.S. Cl.

CPC ............. *H01Q 21/29* (2013.01); *H01Q 5/371* (2015.01); *H01Q 9/265* (2013.01); *H01Q 9/40* (2013.01); *H01Q 21/205* (2013.01)

(58) Field of Classification Search

CPC ............. H01Q 5/40; H01Q 9/40; H01Q 21/29

See application file for complete search history.

(56) References Cited

U.S. PATENT DOCUMENTS 6,184,828 B1 * 2/2001 Shoki ........................ H01Q 3/26 342/372
6,295,035 B1 * 9/2001 Holzheimer ............. H01Q 3/40 343/797

* cited by examiner

*Primary Examiner* — Robert Karacsony

(57) ABSTRACT

An antenna comprises a substantially circular ground plane with an upper surface and a defined center. A plurality of radiating elements are placed radially on the upper surface, arranged at constant angles around the defined center to, when electrically excited, create a plurality of circularly polarized electromagnetic emissions. Each radiating element of the plurality of radiating elements is in electrical communication with an electromagnetic source via an electrically conductive feed, the electromagnetic source configured, when in use, to create a radial excitation current on the radiating element, and further configured, when in use, to provide phase and amplitude control of the excited current on the radiating element for both beam forming and 360 degree beam steering by superposing omnidirectional circularly polarized electromagnetic emissions.

3 Claims, 14 Drawing Sheets

SYSTEMS AND METHODS FOR CIRCULAR-POLARIZED BEAM FORMING AND STEERING BASED ON THE SUPERPOSITION OF CIRCULAR MODES FOR COMMUNICATION AND RADAR SYSTEMS

BACKGROUND 4G technologies that operate in radio frequency (RF) bands at a few gigahertz exploit diffraction for non-line-of-sight communication, and to extend the coverage range in crowded urban areas, as illustrated in FIG. 1. The utilized repeater antennas are typically omnidirectional antennas or multiple wide beam antennas covering 360° in azimuth.

FIG. 1 is a representation of a prior-art network that includes, at 101, repeaters equipped with multiple wide-beam antennas to provide 360 degree coverage. No phased array is present to direct the beam to the user(s), and these networks rely on a variety of ways of reaching the user. For example, the network in FIG. 1 can use line of sight communication (represented by the dotted line at 102). At 103, signals are shown passing through foliage to reach receiving nodes, while the beam path at 104 represents non-line-of-sight communication through diffraction by obstacles and buildings.

On the other hand, 5G New Radio (NR) networks (as shown in FIG. 2) utilize the wide spectrum available at millimeter-wave (mm-wave) frequencies to enable high throughput communication. Despite providing a larger available bandwidth and thereby allowing for a higher throughput communication, as compared to the few gigahertz RF frequencies, however, communication at mm-wave frequencies suffer more from free space attenuation, penetration loss (losses caused by wave propagation through buildings and walls), attenuation caused by rain, foliage loss, diffraction loss, shadowing effect caused by obstacles, and fading effect due to the increased interactions with the surrounding environment specifically in the crowded urban areas.

Therefore, a single omnidirectional antenna radiating electromagnetic waves in all directions would not work well in case of 5G, and instead, the electromagnetic emission should be directed to desired areas using phased array antennas, so that the propagation loss of mm-wave signals would be compensated for by directing more power to the user(s). Considering that a 360-degree coverage is required at repeaters, and that the coverage of phased arrays is typically limited, multiple phased arrays should be employed, which adds to the system cost and complexity.

This network is represented in FIG. 2, where we see, at 201, 5G repeaters equipped with multiple phased arrays to provide a 360-degree coverage, which can be mounted on available 4G infrastructure. Because a phased array is used, the beam emitted by the antenna is also steerable, at 202. Line-of-sight communication is shown in 203, while 204 shows the non-line-of sight communication where the signals are bouncing around obstacles (including foliage and buildings) by the help of local repeaters 205 to avoid foliage loss and diffraction loss by obstacles at mm-wave frequencies.

Unfortunately, the existing 5G networks require multiple phased array antennas to provide a complete 360-degree azimuthal coverage at the repeater, which can be expensive. In addition, the linearly polarized beams provided by the existing networks suffer from the fading effect due to the multiple interactions of signals with the surrounding environment and the transmission loss due to rain, foliage, diffraction, and partial blockage by obstacles. Also, in current planar phased arrays, as the beam is steered, the beamwidth of the main lobe increases.

All these drawbacks mean that a need exists for a relatively inexpensive single antenna that allows for full beam formation and steering over 360 degrees of azimuth with circular polarization and without any change in beamwidth. Circular polarization is less prone to rain and foliage and reduces the fading effect.

SUMMARY

Embodiments of the present invention involve a novel and nonobvious method and system for providing beam forming and 360-degree beam steering over azimuth.

In an embodiment, an antenna comprises a substantially circular ground plane with an upper surface and a defined center. A plurality of radiating elements is radially disposed around the center, with each radiating element being arranged at constant angles around the defined center. When electrically excited via an electromagnetic source, the radiating elements create a plurality of circularly polarized electromagnetic emissions. The electromagnetic source is configured to, when in use, create a radial excitation current on the radiating element, and further configured to, when in use, provide phase and amplitude control of the excited current on the radiating element for both beam forming and 360 degree beam steering through superposing omnidirectional circularly polarized electromagnetic emissions.

In an embodiment, a method for circular-polarized beam forming and 360-degree beam steering is introduced, the method comprising creating a plurality of superposed omnidirectional circular-polarized waves, where each omnidirectional circular-polarized wave in the plurality of superposed waves has an azimuthal radiation phase profile. The unique azimuthal radiation phase profile offered by each omnidirectional circular-polarized wave is leveraged for beam forming and 360 degrees of beam steering.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

One or more of the systems and methods described herein describe a way of providing a system and method for noninvasive searches. As used in this specification, the singular forms "a" "an" and "the" include plural referents unless the context clearly dictates otherwise. Thus, for example, the term "a computer server" or "server" is intended to mean a single computer server or a combination of computer servers. Likewise, "a processor," or any other computer-related component recited, is intended to mean one or more of that component, or a combination thereof.

One skilled in the art will understand, in the context of embodiments of the invention, that the term "a combination of" includes zero, one, or more, of each item in the list of items to be combined.

In an embodiment, multiple omnidirectional Circularly Polarized (CP) waves, each with a specific azimuthal phase profile, are excited at substantially the same time and within a defined certain area, and the difference in their phase profiles is leveraged to provide both beam forming and beam steering. Each omnidirectional CP wave is created by exciting two degenerate circular $TE_{n1}$ modes with a specific relative azimuth angle and a relative excitation phase of 90°.

Embodiments of the invention provide for each omnidirectional CP wave acting like an antenna in a conventional antenna array, and by amplitude and phase control of each omnidirectional CP wave, beam forming and steering are accomplished. As opposed to conventional phased arrays utilizing multiple antennas to provide beam forming and steering, in embodiments of the present invention, all omnidirectional CP waves are created by a single antenna that eliminates issues with coupling between antenna elements and grating lobes.

Figure 1:
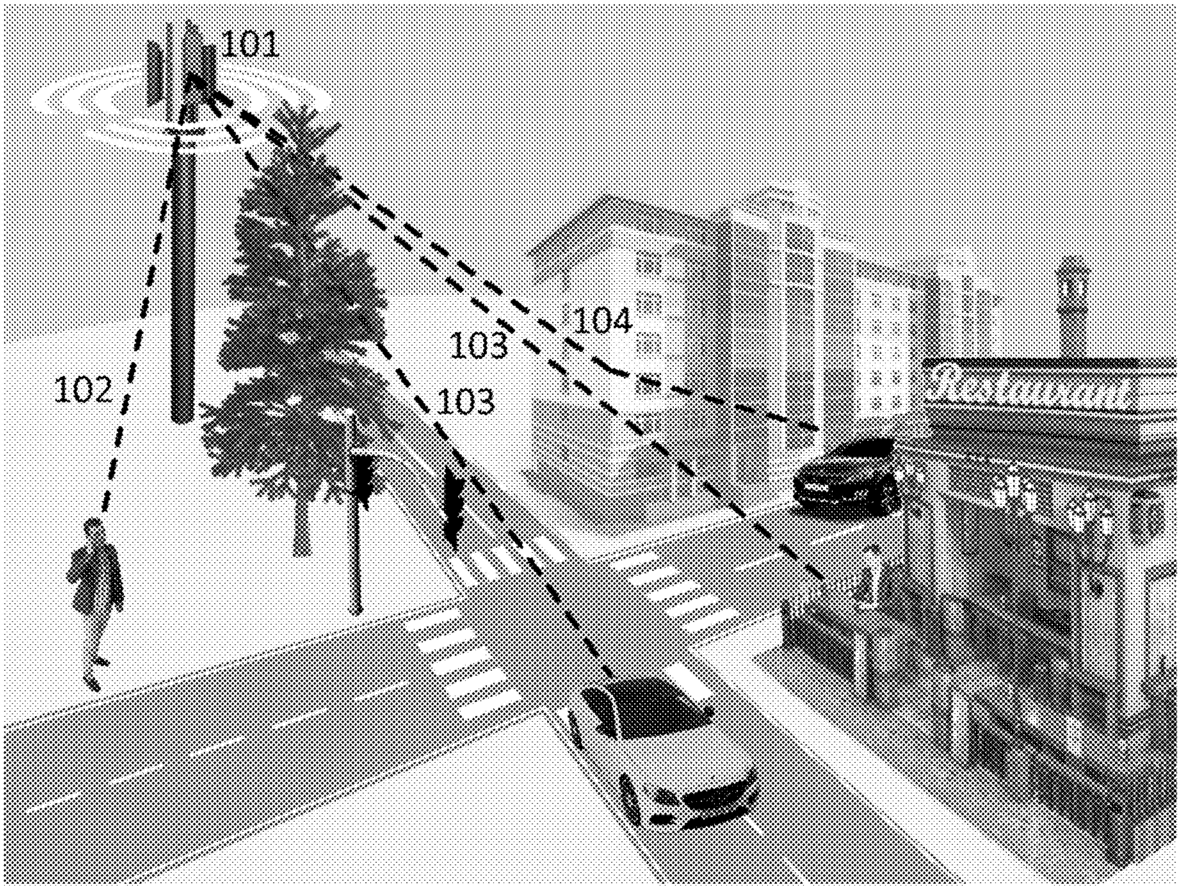
FIG. 1 is a pictorial representation of a prior art system for providing a 4G cellular network, according to an embodiment of the invention.
Figure 2:
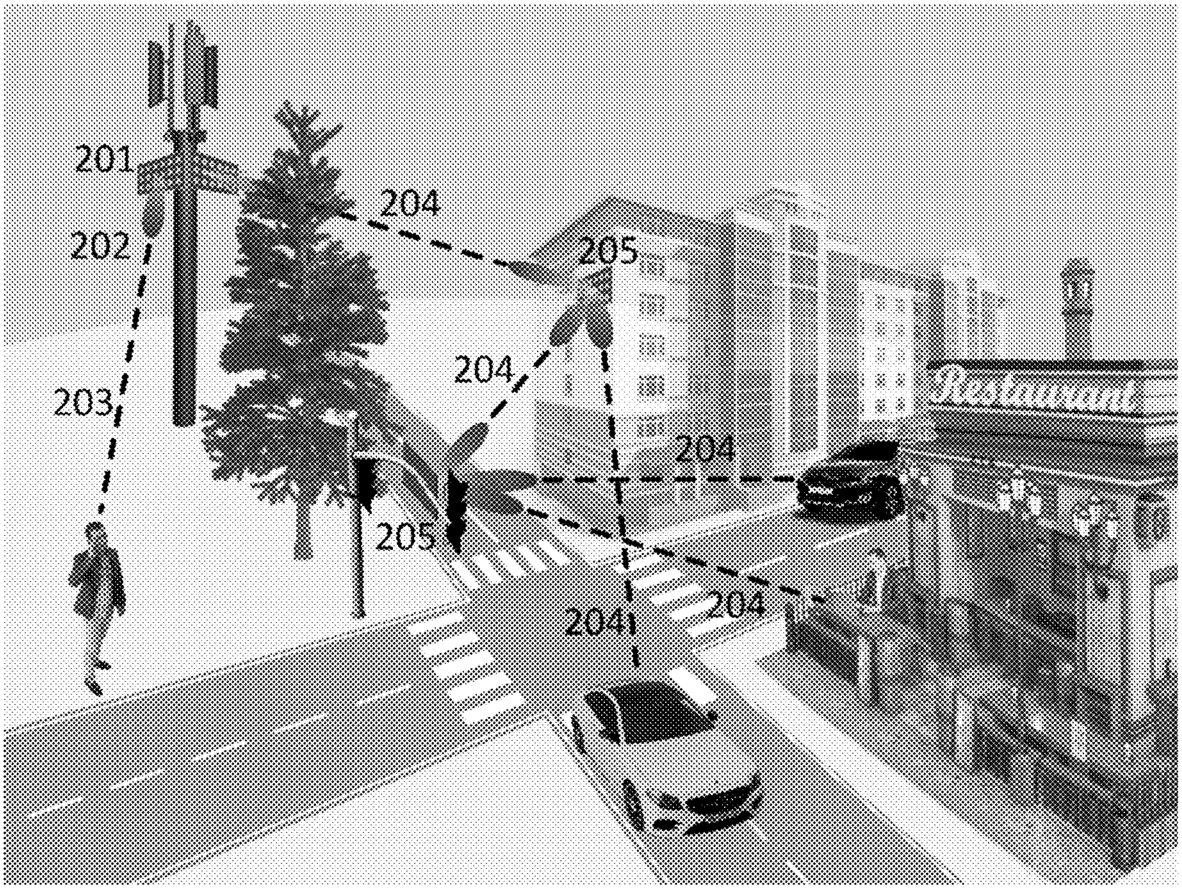
FIG. 2 is a pictorial representation of a prior art system for providing a 5G cellular network, according to an embodiment of the invention.
Figure 3:
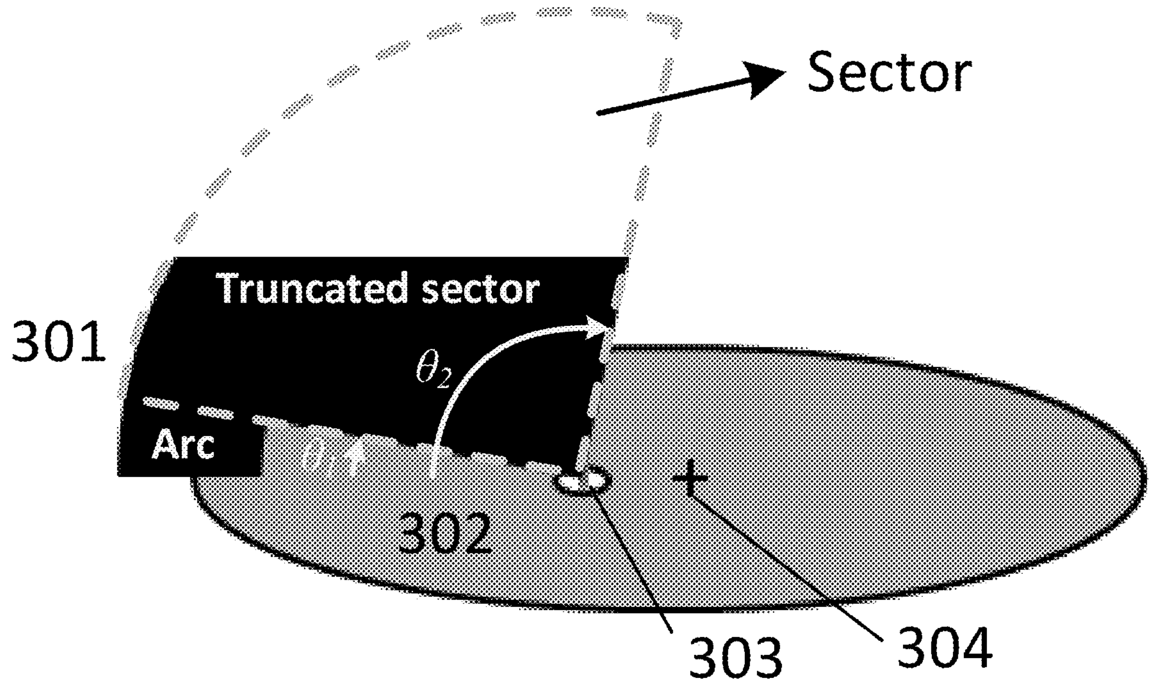
FIG. 3 is a schematic diagram of an embodiment of a radiating element, according to an embodiment of the invention.

FIG. 3 is a schematic diagram of an embodiment of an antenna, according to an embodiment of the invention. A sectorial loop element also called a sectorial loop antenna, or "SLA") 301 is radially positioned on circular ground plane 302 and comprises a truncated sector (confined within $\theta_1$ and $\theta_2$ and truncated from the top) and an arc that connects the end of the sector to the ground plane. The SLA is electrically coupled to an electrical source via electrical feed 303, located near the center 304 of the ground plane. In an embodiment, the electrical source is a coaxial cable that is threaded through the aperture. The electrical source provides power to the SLA 301. In an embodiment, multiple SLA elements are used, and a separate electrical feed is provided for each SLA element, allowing for independent control of the SLA's excitation phases and amplitudes.

In an embodiment featuring a communication system, each electrical feed generates an excitation current that contains the desired message or a modulated form of the desired message. In an embodiment featuring a radar system, the excitation current comprises a waveform that is engineered to obtain the required detection and ranging performance.

Figure 4:
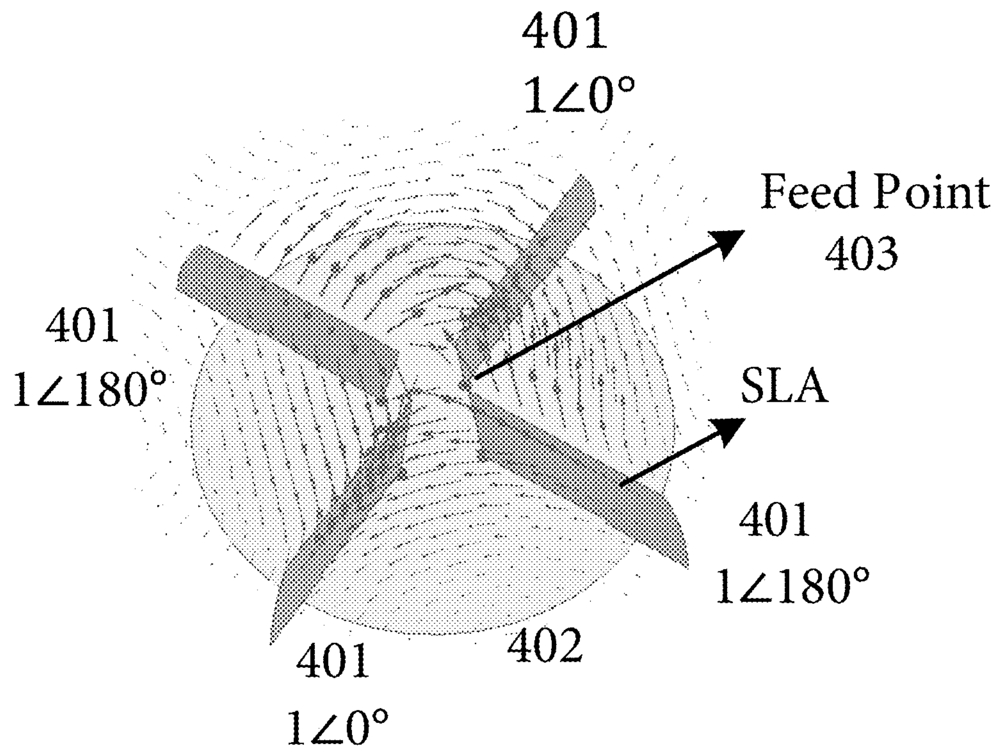
FIG. 4 is a schematic diagram of an antenna including four monopole sectorial loop antennas (SLAs), also called sectorial loop elements, along with the phase and amplitude of currents required to excite circular $TE_{21}$ mode, and a representation of the electric field of the excited circular $TE_{21}$ mode, according to an embodiment of the invention.

In an embodiment to excite the circular $TE_{n1}$ mode, 2n equally separated monopole SLAs are placed on a substantially circular ground plane. These 2n SLAs have an angular separation of 360°/(2n) and are excited with the same amplitude and an inter-element phase difference (the phase difference between adjacent elements) of 180°. FIG. 4 is a schematic diagram of an antenna including four monopole sectorial loop elements (SLAs) 401, which are arranged in equal angular distances from one another in a radial pattern on the circular ground plane 402, to excite the circular $TE_{21}$ mode, according to an embodiment. Each SLA is excited via an electrical connection fed through circular ground plane 402 via feedpoint 403. The field arrows display a representation of the electric field of the generated circular $TE_{21}$ mode at the near field of the antenna.

To obtain an omnidirectional Circularly Polarized ("CP") wave, a circular $TE_{n1}$ mode and its degenerate mode must be excited simultaneously. To excite the degenerate $TE_{n1}$ mode, another set of 2n monopole SLAs that are (i) spatially rotated by 180°/(2n) and (ii) excited by a relative phase of 90° with respect to the first set of elements, is used. Thus, to excite both the nth mode and its degenerate mode, 2(2n) elements are needed. The required excitation amplitudes for all elements are the same, and the phase difference between each two adjacent elements is 90 degrees. Looking from the top of the ground plane, if the elements are consecutively numbered from 1 to 4n in a clockwise direction, then the required excitation phase for the mth ($m=1, 2, \ldots, 4n$) element is $\pm 90° \times (m-1)$, where plus/minus sign determines the handedness of the radiating omnidirectional CP wave.

Figure 5:
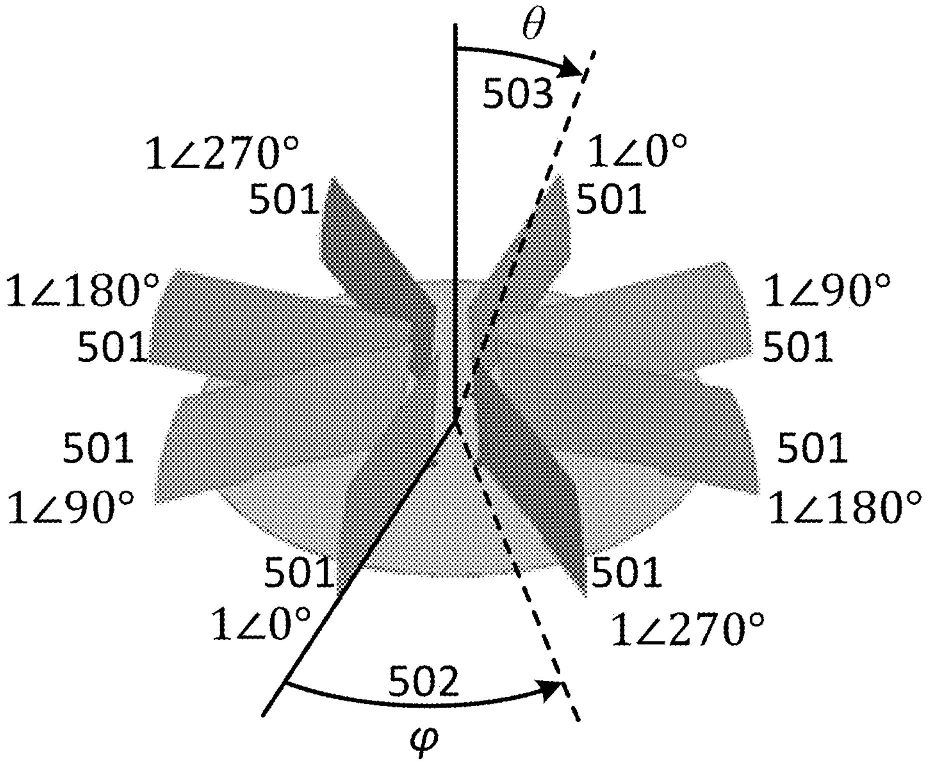
FIG. 5 is a schematic diagram of an embodiment of an antenna with 8 monopole SLAs required to excite circular $TE_{21}$ mode and its degenerate mode to obtain circular polarized omnidirectional wave, according to an embodiment of the invention.

FIG. 5 shows the required arrangement of SLAs and their excitations to excite two degenerate $TE_{21}$ modes for providing an omnidirectional CP beam (here a right-handed CP wave), according to an embodiment. In FIG. 5, looking from the top, if excitation phases of SLAs 501 decrease/increase in clockwise direction, the resulting circular polarization will be left-handed circularly polarized (LHCP) or right-handed circularly polarized (RHCP), respectively CP (LHCP/RHCP). This is true for each $TE_{n1}$ mode excited in conjunction with its degenerate one.

In an embodiment, creating a directive CP beam (beam forming) and 360-degree steering of the formed directive CP beam are accomplished by adjusting the relative amplitude and phase of several omnidirectional CP emissions, through adjusting the phase and amplitude of their excitation currents, and superposition of such emissions. In general, using 2(2N) monopole SLA elements, all first N circular $TE_{n1}$ modes (n=1, 2, . . . , N) along with their degenerate modes, can be excited. The required excitation signal at the m'=1, 2, . . . , 4N) element for exciting the $n^{th}$ (n=1, 2, . . . , N) mode and its degenerate one is $1e^{j(\pm\pi/2\times n(m-1)/N)}$ (the sign determines the handedness of the CP radiation).

It can be mathematically shown that the phase of the radiated wave obtained by exciting circular $TE_{n1}$ mode and its degenerate one varies by nϕ in azimuth (ϕ is azimuth angle 502) while its amplitude is maintained approximately constant over azimuth and within a wide range of elevation angles (θ) 503. The radiated signal can be represented by $Ae^{\pm jn\phi}$, where A is the amplitude of the radiated wave, and the sign of the phase variation (nϕ) depends on the handedness of the CP waves.

Assuming the first N circular $TE_{n1}$ modes (n=1, 2, . . . , N) and their degenerate modes, which have a relative angular (azimuth angle) spacing of 180°/(2n), are excited with a relative phase of 90°, the total radiated wave is given by:

$$S = \sum_{n=1}^{N} Ae^{jn\phi} = A\frac{\sin\left(\frac{N\phi}{2}\right)}{\sin\left(\frac{\phi}{2}\right)}.$$

This indicates a directive pattern with the main beam at ϕ=0°.

To steer the beam to $\phi=\phi_0$, an additional excitation phase of $n\phi_0$ should be applied to the circular $TE_{n1}$ mode and its degenerate mode. In this case, the total radiated wave obtained by exciting the first N circular $TE_{n1}$ modes (n=1, 2, . . . , N) and their degenerate modes is given by:

$$S = A\sum_{n=1}^{N} e^{jn(\phi-\phi_0)} = A\frac{\sin\left(\frac{N(\phi-\phi_0)}{2}\right)}{\sin\left(\frac{(\phi-\phi_0)}{2}\right)}.$$

This indicates a directive pattern whose main beam is steered to $\phi=\phi_0$. Here, the pattern's shape (beam beamwidth and side lobes) is maintained as the steering angle ($\phi_0$) is varied.

To excite the first N circular $TE_{n1}$ modes along with their degenerate modes for steering the beam to $\phi_0$, the required excitation signal at mth element ($I_m$) is:

$$I_m = \sum_{n=1}^{N} a_n e^{j\left(\frac{2\pi}{4N}n(m-1)-n\phi_0\right)},$$

where $a_n$ is the amplitude scaling factor of the nth excitation mode which can be adjusted for beamforming purposes.

Figure 6:
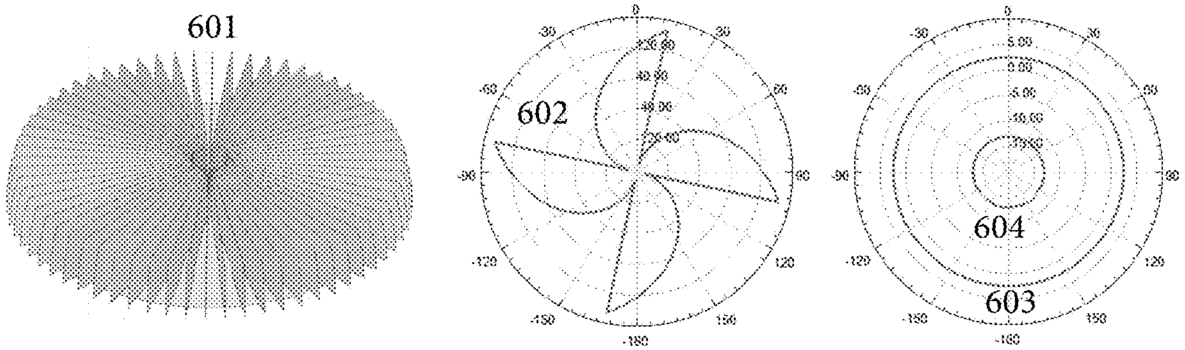
FIG. 6 is a schematic diagram of an antenna, along with a representation of its circularly polarized omnidirectional radiation obtained by excitation of the circular $TE_{41}$ mode and its degenerate mode, according to an embodiment of the invention.

FIG. 6 is a schematic diagram of an antenna, along with its circularly polarized radiation obtained by excitation of a circular $TE_{41}$ mode and its degenerate mode, according to an embodiment of the invention. FIG. 6 shows an antenna 601 with 64 monopole SLAs whereby up to the first 16 modes can be excited. If only the circular $TE_{41}$ mode and its degenerate mode are excited (to provide an omnidirectional LHCP radiation), the resulting phase profile around the antenna is shown in 602. The LHCP and RHCP gain patterns are shown in 603 and 604, respectively. According to the phase profile 602, as ϕ (the azimuth angle around the center of the ground plate) varies from 0° to 360°, the radiation phase varies by 4ϕ. According to 603 and 604, the radiation is omnidirectional LHCP with better than 15 dB of polarization isolation.

Figure 7:
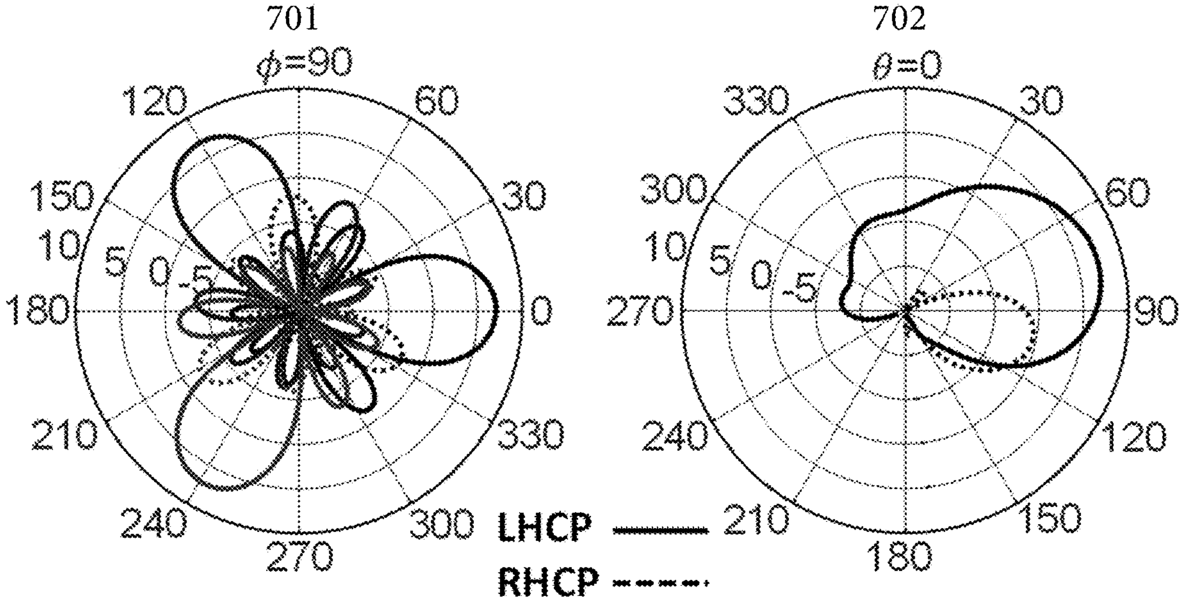
FIG. 7 is a graphical diagram of the steered directive radiation patterns created by proper excitation of the first 10 circular TEni modes and their degenerate modes, according to an embodiment of the invention.

FIG. 7 is a graphical diagram of the directive radiation patterns created by proper excitation of the first 10 circular $TE_{n1}$ modes and their degenerate modes using the antenna 601, according to an embodiment of the invention. When only the first 10 circular $TE_{n1}$ modes and their degenerate modes are excited to create an omnidirectional LHCP wave, the resulting gain patterns for different steering (azimuth) angles ($\phi_0$) are shown in 701. In an embodiment, the 3-dB beamwidth is maintained constant as the beam is steered. At 702, LHCP and RHCP gain patterns (in dBi) over elevation (θ) is shown at the direction of the main beam in azimuth ($\phi=\phi_0$). As the large difference between gains of LHCP and RHCP indicates, in 702, a CP wave with a wide beam (θ in the range 40°-75°) is obtained in elevation. The lateral dimension of the antenna 601 is $1.6\lambda_0\times\times1.6\lambda_0$ (where $\lambda_0$ is the wavelength at the center frequency of operation).

Figure 8:
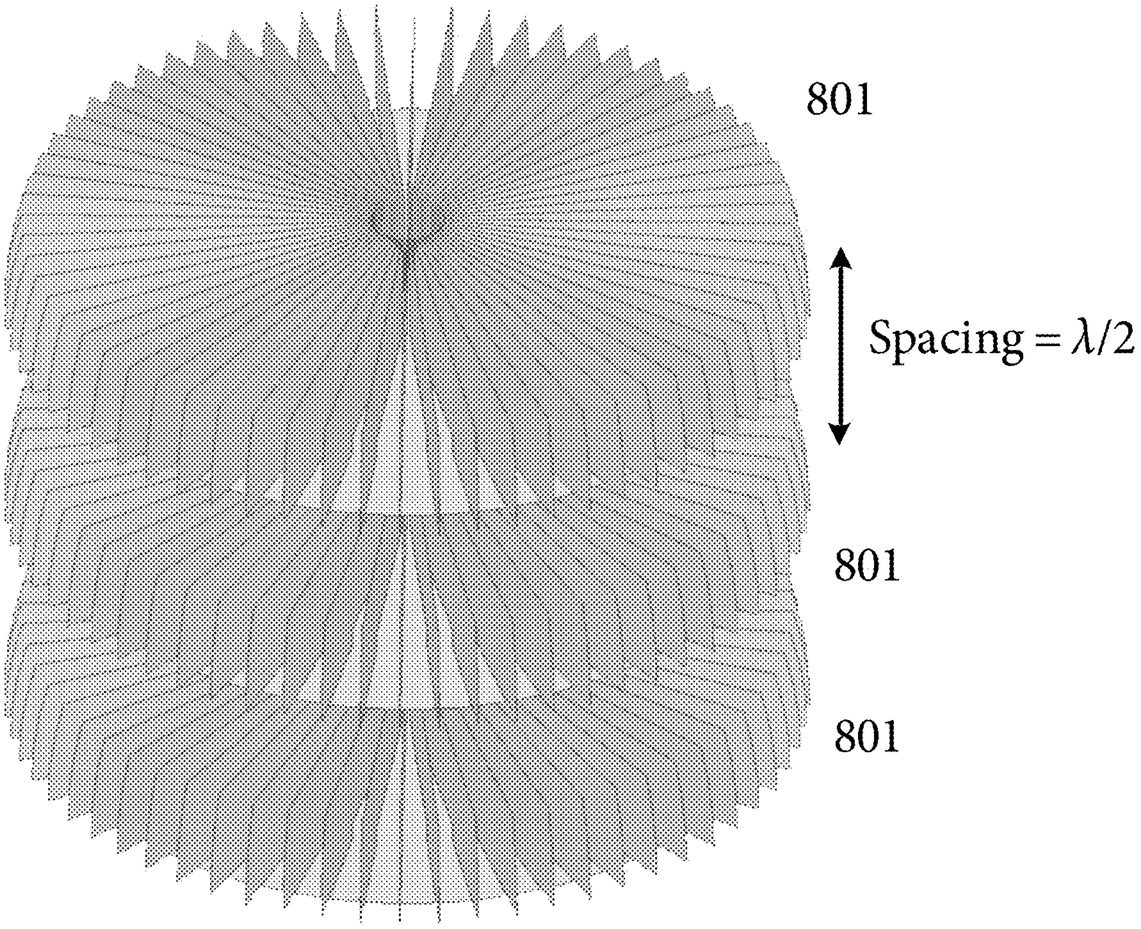
FIG. 8 is a schematic diagram of stacked antennas for beam forming and steering in elevation, according to an embodiment of the invention.

FIG. 8 is a schematic diagram of stacked antennas for beam forming and steering in elevation, according to an embodiment of the invention. Large beamwidth of embodiments of the invention in elevation (from θ=40° to θ=75° in 702) allows for beam forming and steering in elevation as well if multiple antennas 801 are stacked as shown in FIG. 8. In an embodiment, the spacing between adjacent stacked antennas is approximately $\lambda_0/2$, where $\lambda_0$ is the free-space wavelength of the emitted beam. In an embodiment where the antennas are stacked, each antenna is relatively low profile (with a height of less than one quarter free space wavelength for each antenna) and exhibits a null or a negligible radiation at the top (θ=0°) and bottom (θ=180°), as shown in 702 in FIG. 7. Therefore, the proposed stacked antenna would not suffer from unwanted grating lobes or a severe coupling between the antennas.

Figure 9:
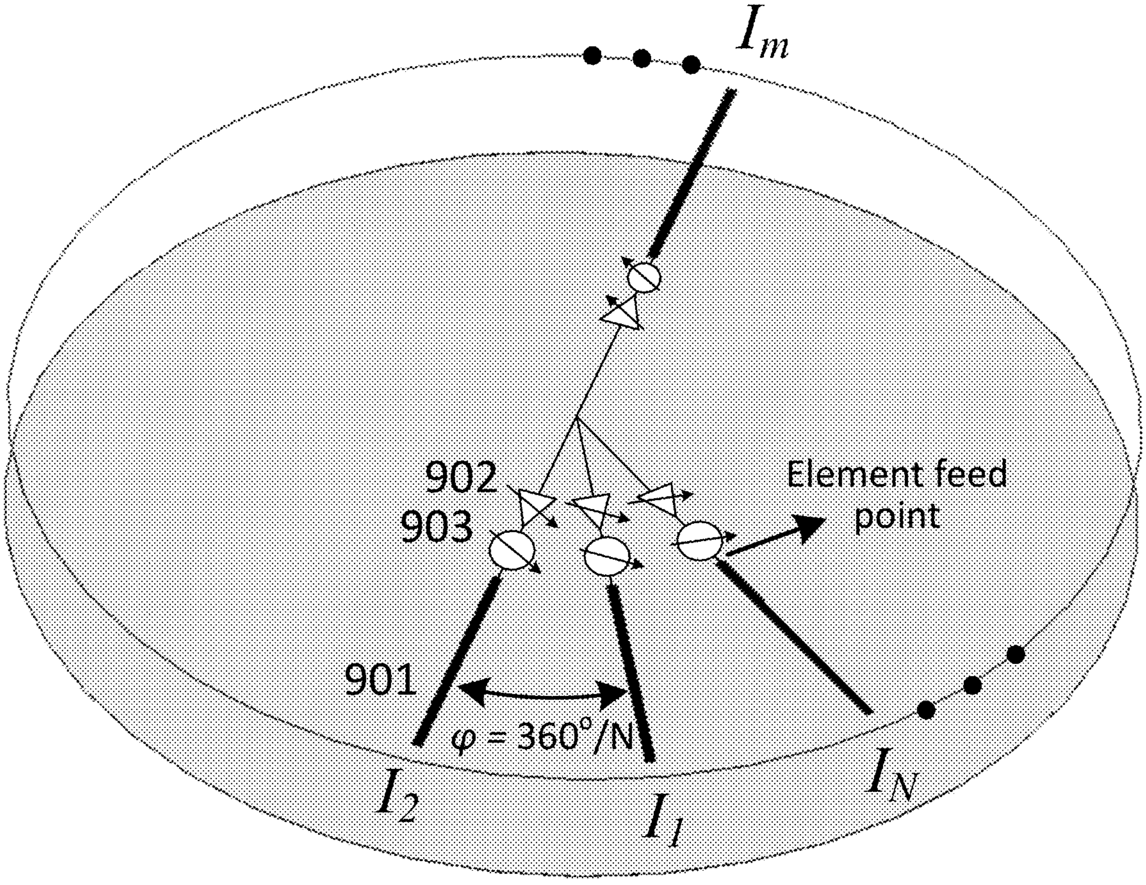
FIG. 9 is a schematic diagram of an antenna allowing for beam forming and 360-degree beam steering using open-ended or short-circuited lines, according to an embodiment of the invention.

FIG. 9 is a schematic diagram of an antenna allowing for beam forming and 360-degree beam steering using open-ended or short-circuited lines, according to an embodiment.

In an embodiment, the radial currents are excited on radial open-ended or short-circuited lines acting as radiating elements. The radiating elements are placed radially in parallel with the upper surface of a ground plane, and being arranged at constant angles around the defined center to, when electrically excited, create circularly polarized electromagnetic emissions. Each of the radiating elements are electrically fed from a location close to the center of the ground plane, as shown in FIG. 9. This structure can lend itself to integration and allows for implementation of a mm-wave communication/radar system (with typically <5% relative bandwidth) on a chip (integrated circuit). In FIG. 9, the open-ended or short-circuited lines, acting as the radiating elements, are shown as 901 and denoted as $I_1, I_2, \ldots I_n, \ldots I_N$. An integrated variable gain amplifier (VGA) 902, and a phase shifter 903, are connected to each radiating element 901 to provide amplitude and phase control for beam forming and steering. In an embodiment, the radiating elements are microstrip lines.

Figure 10:
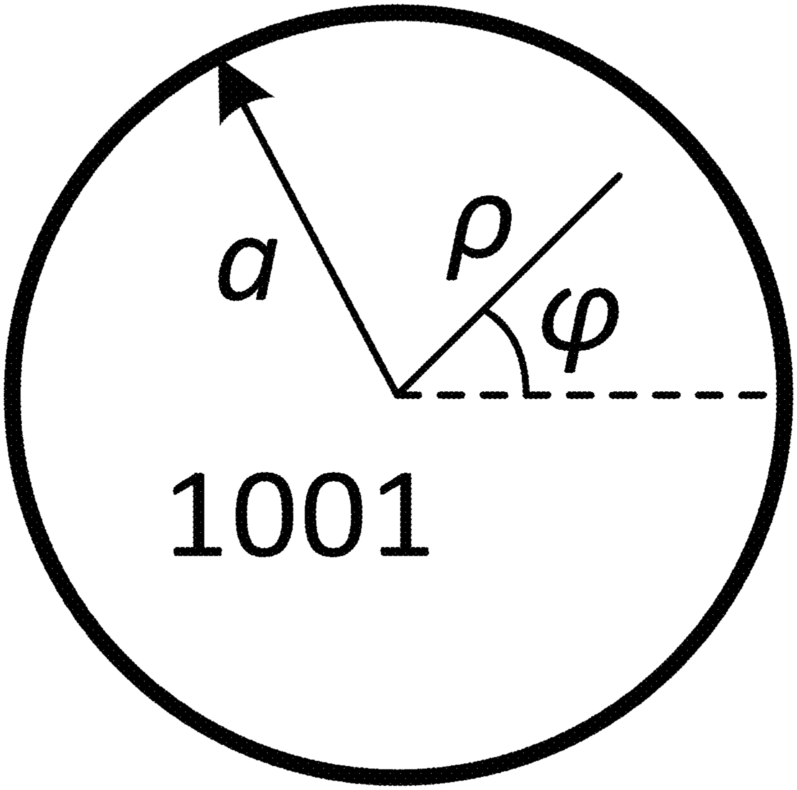
FIG. 10 is a schematic diagram of a circular aperture in cylindrical coordinates, according to an embodiment.

Embodiments of the invention rely on the creation and superposition of multiple (N) omnidirectional CP waves, each being obtained from the excitation of a circular $TE_{n1}$ (n=1, 2, . . . , or N) mode along with its degenerate mode. The electric field of a circular $TE_{n1}$ mode ($\overline{E}_n$) over a circular aperture with radius a, as represented in FIG. 10, can be described by:

$$\overline{E}_n = \frac{n}{\rho} J_n\left(\frac{\chi'_{n1}}{a}\rho\right)\sin(n\phi)\hat{\rho} + \frac{\chi'_{n1}}{a} J'_n\left(\frac{\chi'_{n1}}{a}\rho\right)\cos(n\phi)\hat{\phi},$$

where ρ and ϕ define the position in a cylindrical coordinate system, $J_n$ is the Bessel function of the first kind and nth order, and its derivative is denoted by $J_n'$. $\chi_{n1}'$ is the first zero of the function $J_n'$.

Figure 11:
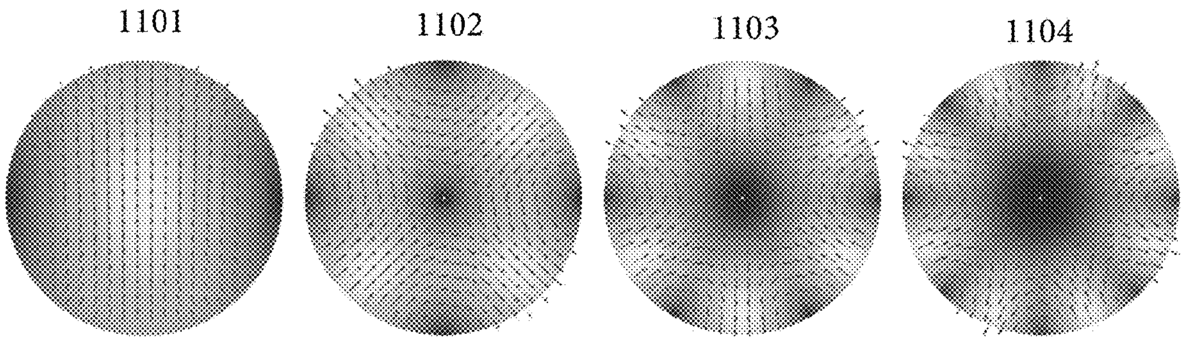
FIG. 11 is a visual representation of the electric field of different circular $TE_{n1}$ modes, according to an embodiment.

FIG. 11 shows the electric field distributions of the first four circular $TE_{n1}$ modes (where n=1, 2, 3, 4). In FIG. 11, the electric field distributions of the circular modes for n=1, 2, 3, and 4 are represented by 1101 (for $TE_{11}$), 1102 (for $TE_{21}$), 1103 (for $TE_{31}$) and 1104 (for $TE_{41}$).

The radiated farfield electric field due to the mode circular $TE_{n1}$ excited at the aperture 1001 in FIG. 10 can be represented as:

$$\overline{E}_{ff,n} = -\frac{jk_o e^{-jk_0 r}}{4\pi r} \int_S -2\left(\hat{z} \times \overline{E}_{a,n}\right) \times \hat{r} e^{jk_0 r' \cdot \hat{r}} ds',$$

where $k_0$ is the free-space propagation constant. The farfield electric field components, $E_{ff,n,\theta}$ and $E_{ff,n,\phi}$, are derived as:

$$\begin{cases} E_{ff,n,\theta} = \dfrac{k_o e^{-jk_0 r}}{2r}\left(\dfrac{\chi'_{n1}}{a}\right) e^{jn\frac{\pi}{2}} (I_{n-1} - I_{n+1})\sin(n\phi) \\ E_{ff,n,\phi}, = \dfrac{k_o e^{-jk_0 r}}{2r}\left(\dfrac{\chi'_{n1}}{a}\right) e^{jn\frac{\pi}{2}} (I_{n-1} + I_{n+1})\cos(n\phi)\cos(\theta) \end{cases},$$

where r, θ and ϕ are spherical coordinate parameters defining a position in 3D space. Moreover, $I_{n+1}$ and $I_{n-1}$ are defined as:

$$I_{n\pm1} = \int_0^a J_{n\pm1}\left(\frac{\chi'_{n1}}{a}\rho'\right) J_{n\pm1}(k_0\rho'\sin(\theta))\rho' d\rho'.$$

Within a wide range of elevation angle (θ), the total farfield electric field is given by:

$$\overline{E}_{ff,n}(\phi) = C(\theta)(\sin(n\phi)\hat{\theta} + \cos(n\phi)\hat{\phi}),$$

where, C(θ) is constant over azimuth (ϕ). The farfield radiation has the following characteristics for θ≠90°:

It is linearly polarized at each azimuth angle ϕ.

Polarization tilt angle varies with ϕ.

Polarizations at locations with angular spacing of 180°/(2n) are orthogonal.

Figure 12:
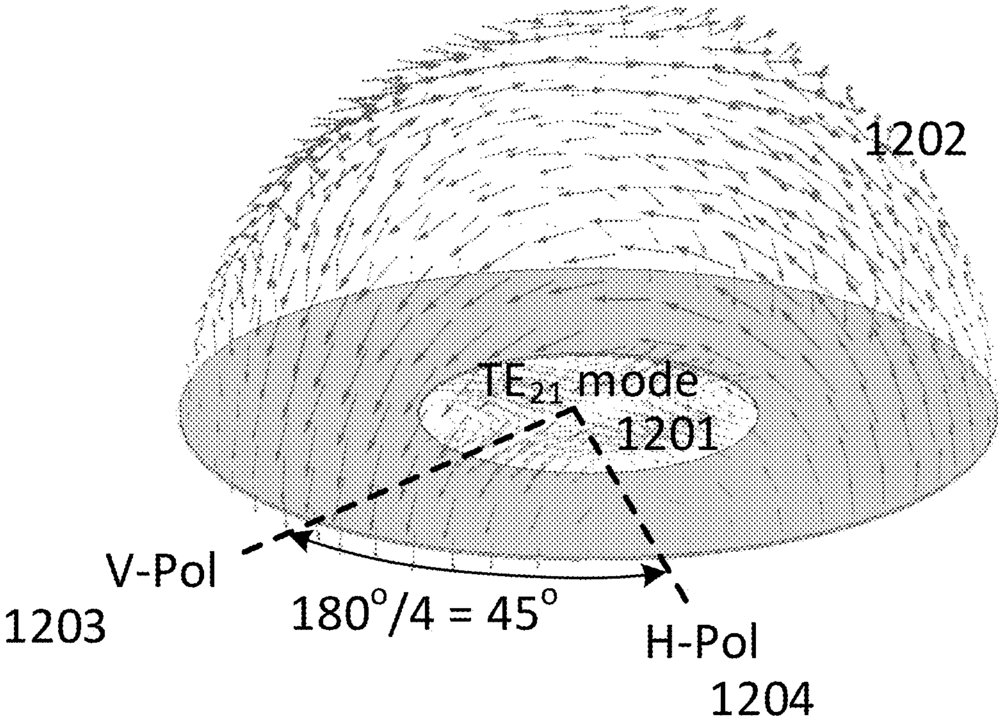
FIG. 12 is a visual representation of the electric field of the excited circular $TE_{21}$ mode and its farfield radiation, according to an embodiment.

FIG. 12 is a representation of the circular $TE_{21}$ mode and its resulting farfield radiation, according to an embodiment. At 1201, the circular $TE_{21}$ mode is shown excited at an aperture. At 1202, we can see a representation of the radiated farfield electric field. 1203 displays the vertical polarization (V-pol) at $\phi_0$, while 1204 displays the horizontal polarization (H-pol, orthogonal to V-pol) at $\phi_0$+45°.

Considering that polarizations at locations with angular spacing of 180°/(2n) are orthogonal, an omnidirectional CP electric field can be created by exciting two degenerate circular $TE_{n1}$ modes with a relative azimuth angle of 180°/(2n) and excitation phase difference of ±90° (the sign determines the handedness of the CP wave). In such a case, the total radiated field as a function of azimuth angle can be represented by:

$$\overline{E}_{ff,tot}(\phi) = \overline{E}_{ff,n}(\phi) + e^{\pm j\frac{\pi}{2}} \overline{E}_{ff,n}\left(\phi - \frac{\pi}{2n}\right) = C\left[(\sin(n\phi) \mp j\cos(n\phi))\hat{\theta} + (\cos(n\phi) \pm j\sin(n\phi))\hat{\phi}\right].$$

This indicates an omnidirectional right/left-handed CP wave

Figure 13:
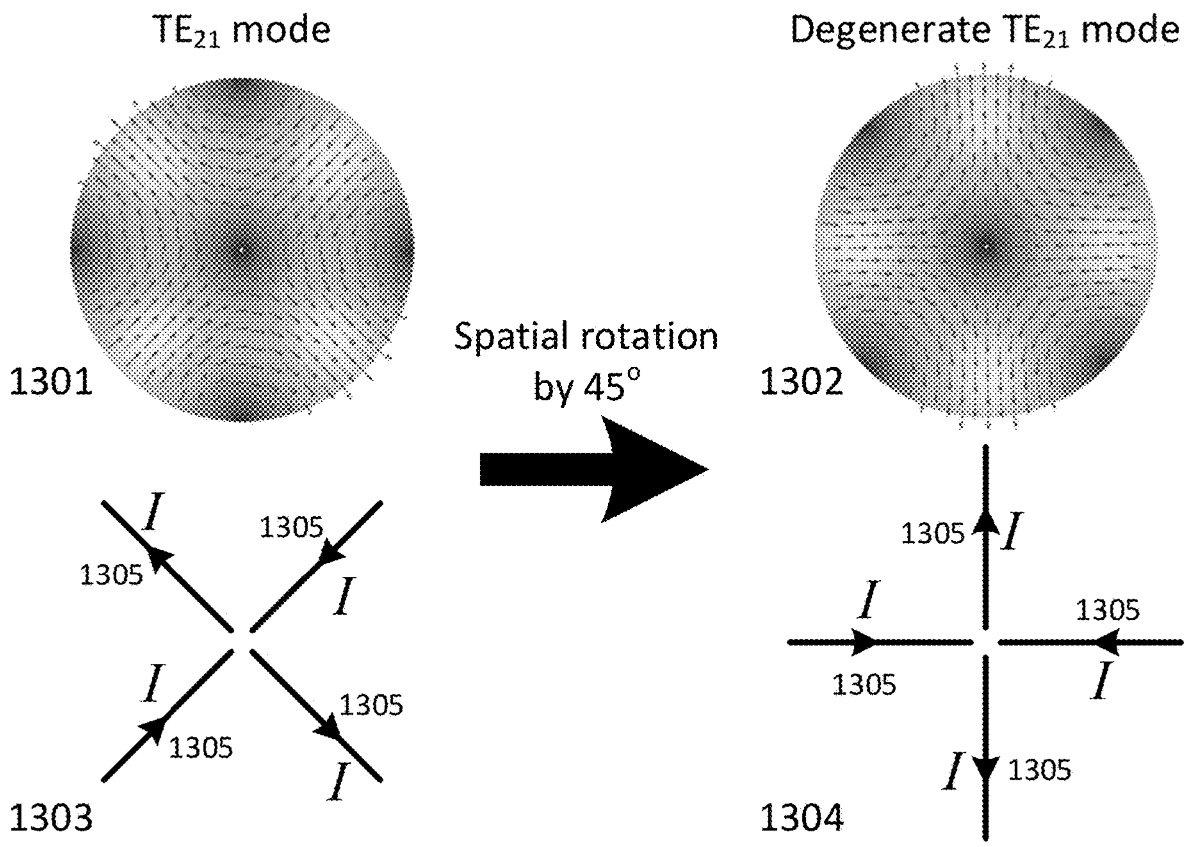
FIG. 13 is a visual representation of the electric fields of the excited circular $TE_{21}$ mode and its degenerate mode, according to an embodiment. It also represents the radial currents required for excitation of the circular $TE_{21}$ mode and its degenerate one.

FIG. 13 is a representation of the circular $TE_{21}$ mode and its degenerate mode of an antenna, according to an embodiment. The circular $TE_{21}$ mode is shown in 1301, and the degenerate $TE_{21}$ mode is shown in 1302. The two represented distributions show the required field distributions to create an omnidirectional CP radiation by two degenerate circular $TE_{21}$ modes. FIG. 13 also represents the required radial currents for excitation of the circular $TE_{21}$ mode (1303) and its degenerate mode (1304), according to an embodiment, where the radial currents are represented by the arrowed lines at 1305.

Figure 14:
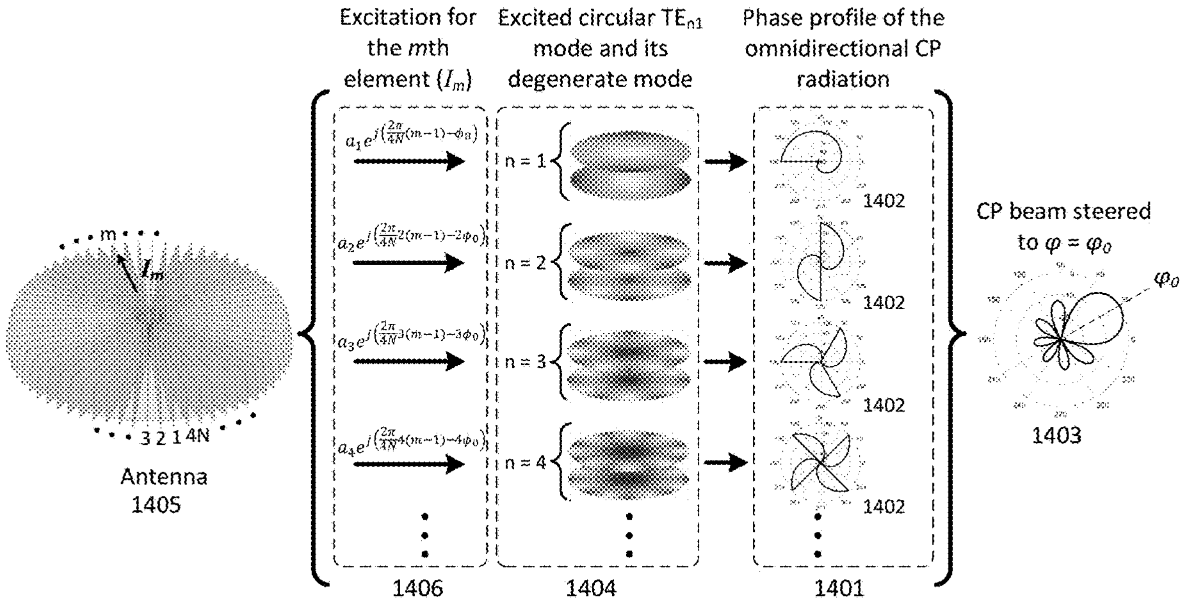
FIG. 14 is a flow chart of a method of beam forming and beam steering, according to an embodiment.

FIG. 14 is a flow chart of the proposed method of beam forming and 360-degree beam steering, according to an embodiment. At 1401, a plurality of superposed omnidirectional circular-polarized waves is created, where each omnidirectional circular-polarized wave has a defined azimuthal phase profile 1402 (equal to n ϕ where n is the mode number and ϕ is the azimuth angle). This phase profile is leveraged to provide beamforming and steering 1403. At 1404, each omnidirectional circular-polarized wave (in the plurality of omnidirectional circular-polarized waves) is generated by excitation of a circular $TE_{n1}$ mode (where n is an integer number greater than or equal to 1 representing the mode number) along with its degenerate mode. The degenerate mode is the same as the circular $TE_{n1}$ mode but is spatially rotated by 180 degrees/(2n), and has a relative excitation phase of 90 degrees. Considering an antenna with 4N radiating elements 1405, 1406 shows the required excitation amplitude and phase for the mth radiating element (m=1, 2, . . . , 4N) to excite the nth circular $TE_{n1}$ mode (different mode numbers n) and its degenerate mode. The summation of the excitations in 1406 results the required excitation for mth element to excite the first N circular $TE_{n1}$ modes and their degenerate modes simultaneously, whereby steering the CP beam to $\phi_0$ while beam forming is also applied by coefficient $a_1, a_2, \ldots, a_N$.

One skilled in the art will understand that the order of elements described in each figure is given by way of example only. In an embodiment, the order of elements performed can be changed in any practicable way.

While certain embodiments have been shown and described above, various changes in form and details may be made. For example, some features of embodiments that have been described in relation to a particular embodiment or process can be useful in other embodiments. Some embodiments that have been described in relation to a software implementation can be implemented as digital or analog hardware. Furthermore, it should be understood that the systems and methods described herein can include various combinations and/or sub-combinations of the components and/or features of the different embodiments described. For example, types of verified information described in relation to certain services can be applicable in other contexts. Thus, features described with reference to one or more embodiments can be combined with other embodiments described herein.

Although specific advantages have been enumerated above, various embodiments may include some, none, or all of the enumerated advantages. Other technical advantages may become readily apparent to one of ordinary skill in the art after review of the following figures and description.

It should be understood at the outset that, although exemplary embodiments are illustrated in the figures and described above, the present disclosure should in no way be limited to the exemplary implementations and techniques illustrated in the drawings and described herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

We claim:

1. A method for emitting a signal from an antenna to a desired configurable direction, comprising:

exciting multiple circular $TE_{n1}$ modes and their degenerate modes to create a plurality of superposed omnidirectional circular-polarized waves, including a first omnidirectional circular-polarized wave with a first azimuthal wave profile and a second omnidirectional polarized wave with a second azimuthal wave profile, where the first azimuthal wave profile depends on an excited mode number n=1 and its degenerate mode, and where the second azimuthal wave profile depends on the excited mode number n=2 and its degenerate mode, and where a difference between the first azimuthal phase profile and the second azimuthal phase profile is leveraged to create a directional and steerable circularly polarized beam.

2. The method of claim 1, further comprising:

encoding data into the plurality of superposed omnidirectional circular-polarized waves.

3. The method of claim 1, where each omnidirectional circular-polarized wave has an excitation amplitude and phase, further comprising:

for each omnidirectional circular-polarized wave in the plurality of omnidirectional circular-polarized wave:

exciting a first circular $TE_{n1}$ mode, where n is an integer number greater than or equal to 1 representing the mode number;

exciting a second circular $TE_{n1}$ mode that is a degenerate mode of the first circular $TE_{n1}$ mode and is spatially rotated relative to the first circular $TE_{n1}$ mode by 180 degrees/(2n), and that has an excitation phase difference of 90 degrees; and controlling the excitation amplitude and phase in a way that forms and steers the beam.

* * * * *